United States Patent
Tanio et al.

(10) Patent No.: US 12,436,018 B2
(45) Date of Patent: Oct. 7, 2025

(54) FUEL GAUGE CONTROL DEVICE

(71) Applicant: TOYOTA JIDOSHA KABUSHIKI KAISHA, Toyota (JP)

(72) Inventors: Akihiko Tanio, Toyota (JP); Akira Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/528,987

(22) Filed: Dec. 5, 2023

(65) Prior Publication Data

US 2024/0240981 A1 Jul. 18, 2024

(30) Foreign Application Priority Data

Jan. 16, 2023 (JP) ................. 2023-004731

(51) Int. Cl.
*G01F 23/80* (2022.01)
(52) U.S. Cl.
CPC .................... *G01F 23/804* (2022.01)
(58) Field of Classification Search
CPC ............ G01F 23/804; B60K 35/22; B60K 2015/03217; B60K 2360/169; B60K 2360/174
See application file for complete search history.

(56) References Cited

U.S. PATENT DOCUMENTS

| | | | |
|---|---|---|---|
| 2010/0312459 A1* | 12/2010 | Utsumi | F02D 19/084 701/106 |
| 2015/0213657 A1* | 7/2015 | Tanaka | G06Q 10/06 701/123 |
| 2017/0136946 A1* | 5/2017 | Yanatsubo | G01F 23/00 |
| 2019/0193713 A1* | 6/2019 | Son | F02N 11/0803 |
| 2023/0020594 A1* | 1/2023 | Inoue | F02D 41/2451 |

FOREIGN PATENT DOCUMENTS

JP 2017-088101 A 5/2017

* cited by examiner

*Primary Examiner* — Sizo B Vilakazi
(74) *Attorney, Agent, or Firm* — SoraIP, Inc.

(57) ABSTRACT

A normal refueling mode, in which refueling is detected when the vehicle is at or below a predetermined vehicle speed and when the vehicle is at a slight stop, and a small amount refueling mode for detecting refueling in a strong stopped state in which the vehicle is determined to be stationary based on the detection result of the shift position sensor and a vehicle speed at or below a predetermined speed, are provided, and the meter ECU performs mode switching control. Then, the remaining amount of fuel is detected by the fuel gauge with different resolutions in the normal refueling mode and the small amount refueling mode, and the remaining amount of fuel is displayed.

4 Claims, 4 Drawing Sheets

FUEL GAUGE CONTROL DEVICE

CROSS-REFERENCE TO RELATED APPLICATION

This application claims priority to Japanese Patent Application No. 2023-004731 filed on Jan. 16, 2023, incorporated herein by reference in its entirety.

BACKGROUND

1. Technical Field

The disclosure relates to a fuel gauge control device.

2. Description of Related Art

Japanese Unexamined Patent Application Publication No. 2017-088101 (JP 2017-088101 A) discloses a remaining fuel amount display device that includes a fuel gauge that displays a remaining amount of fuel in a fuel tank, a remaining fuel amount detection unit that detects the remaining amount of fuel, a fuel remaining amount instruction value calculation unit that successively calculates an instruction value of the remaining amount of fuel, based on the remaining amount of fuel, a display control unit that updates display of the fuel gauge with the instruction value that is successively calculated, and a fuel consumption amount calculation unit that calculates a fuel consumption amount of an engine that is the fuel consumption amount within an interval during which the instruction value is calculated by the fuel remaining amount instruction value calculation unit. When a previous-time instruction value calculated the previous time is greater than a detection value of the remaining fuel amount detected by the remaining fuel amount detection unit, the remaining fuel amount instruction value calculation unit calculates the instruction value by subtracting, from the previous-time instruction value, a subtraction value that is greater than a most-recent fuel consumption amount calculated by the fuel consumption amount calculation unit but is no greater than a sum of this fuel consumption amount and a difference between the previous-time instruction value and the detected value, and that becomes greater the greater the difference between the previous-time instruction value and the detected value becomes.

SUMMARY

Now, in control of fuel gauges that display the remaining amount of fuel, when a specification thereof is to make a determination to transition from refueling standby to refueling mode (hereinafter referred to as refueling determination in some cases) on the premise that a vehicle is stopped, the accuracy of stopped determination itself affects the reliability of the refueling determination.

Examples of methods for determining whether the vehicle is stopped include determining that the vehicle is stopped when vehicle speed is no more than a threshold value set in advance, and using information regarding a shift position or a parking brake. When the vehicle speed is used, 0 km/h cannot be sensed in a strict sense, and accordingly there is a need to perform determination in which extreme low-speed traveling is deemed as being stopped. On the other hand, when information regarding the shift position and the parking brake is used, whether the vehicle is stopped can be accurately determined. However, there are regions in which refueling work is performed while in the driving range, due to reasons such as the parking brake being generally not used in certain local situations, security issues, and so forth. Accordingly, there is room for improvement in the way of carrying out refueling determination.

The disclosure has been made taking the above facts into consideration, and accordingly, it is an object thereof to provide a fuel gauge control device that is capable of improving the reliability of refueling determination.

A fuel gauge control device according to a first aspect includes a control unit that includes a first refueling mode in which refueling is detected in a first stopped state in which a vehicle speed is no greater than a vehicle speed set in advance, and a second refueling mode in which refueling is detected in a second stopped state in which a vehicle is determined to be in a stopped state in which the vehicle speed is no greater than the vehicle speed set in advance, and based on shift position information or parking brake information. Switching control of modes is performed based on a state of the vehicle.

According to the first aspect, the first refueling mode is provided in which stopping is determined based on vehicle speed alone, and refueling is detected. Thus, even when the shift position is in parking range or neutral range, or the parking brake is not in an operating state, whether the refueling mode can be transitioned to can be determined. Also, by providing the second refueling mode in which stopping is determined based on information regarding the shift position in addition to the vehicle speed, and refueling is detected, refueling determination can be made after stopping is reliably determined. Accordingly, the reliability of refueling determination can be improved as compared to when a single refueling mode is provided.

According to a fuel gauge control device of a second aspect, in the fuel gauge control device according to the first aspect, in the second refueling mode, a small fuel increase is detected as compared to the first refueling mode.

According to the second aspect, a smaller amount of fuel increase is detected than in the first refueling mode, refueling determination can be performed with higher detection accuracy than in the first refueling mode.

According to a fuel gauge control device of a third aspect, in the fuel gauge control device according to the first aspect or the second aspect, the second stopped state is a state in which the vehicle speed is no greater than the vehicle speed set in advance, and a shift position continues to be a parking range or a neutral range for a duration of time set in advance.

According to the third aspect, stopping can be determined more reliably than when determining stopping by the vehicle speed alone.

According to the fuel gauge control device of a fourth aspect, in the fuel gauge control device according to the first aspect or the second aspect, the second stopped state is a state in which the vehicle speed is no greater than the vehicle speed set in advance, and a parking brake continues to be in operation for a duration of time set in advance.

According to the fourth aspect, stopping can be determined more reliably than when determining stopping by the vehicle speed alone.

As described above, according to the disclosure, a fuel gauge control device can be provided that is capable of improving the reliability of refueling determination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an example of the embodiment of the present disclosure will be described in detail with reference to the drawings.

First Embodiment

Figure 1:
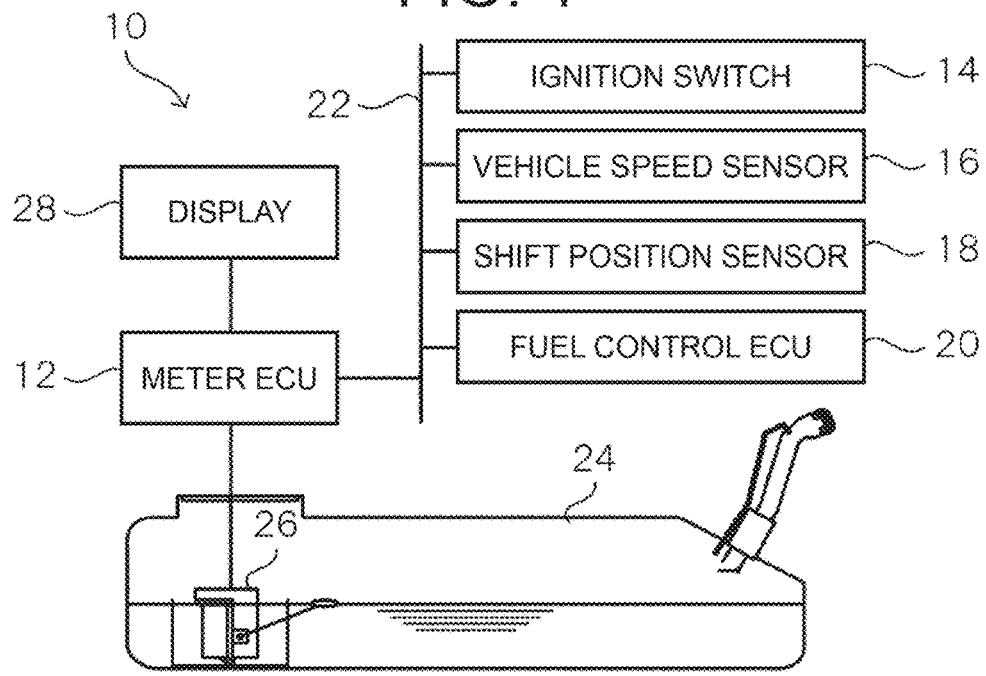
FIG. 1 is a block diagram showing a schematic configuration of a vehicle control device according to a first embodiment.

In the present embodiment, a vehicle control device including a meter Electronic Control Unit (ECU) as an example of a fuel gauge control device will be described as an example. FIG. 1 is a block diagram showing a schematic configuration of a vehicle control device according to this embodiment.

The vehicle control device 10 according to this embodiment includes a meter ECU 12 as shown in FIG. 1. Note that the meter ECU 12 functions as an example of a control unit.

A display 28 and a fuel gauge 26 are connected to the meter ECU 12, and the vehicle network 22 to which the ignition switch 14, the vehicle speed sensor 16, the shift position sensor 18, the fuel control ECU 20 and the like are connected. As the vehicle network 22, for example, Controller Area Network (CAN), Local Interconnect Network (LIN), FlexRay, CAN with Flexible Datarate (CANFD), etc. are applied. Although FIG. 1 shows an example in which the vehicle speed sensor 16, the shift position sensor 18, and the fuel control ECU 20 are connected to the vehicle network 22, the sensors and ECU are not limited to these. The ECU is also connected.

The display 28 is provided, for example, at a position corresponding to the front of the driver on the instrument panel, but may be provided at the central portion of the instrument panel or the like. Various information such as vehicle speed, shift position, and fuel gauge are displayed on the display 28.

The fuel gauge 26 is provided in the fuel tank 24 that stores fuel, detects changes in the fuel level by means of a floater, and outputs a signal that changes according to the fuel level to the meter ECU 12.

A vehicle speed sensor 16 detects the traveling speed of the vehicle, and a shift position sensor 18 detects the shift position.

A fuel control ECU 20 controls fuel injection to the internal combustion engine. In this embodiment, the amount of fuel used can be calculated by calculating the fuel injection amount.

The meter ECU 12 acquires various information from various sensors and ECUs connected to the vehicle network 22. Then, the meter ECU 12 controls the display 28 based on the acquired information, and performs processing for displaying various types of vehicle information such as a fuel gauge that displays the remaining amount of fuel, the operation status of driving support devices, and the like. Further, when an abnormality of the vehicle occurs, the meter ECU 12 notifies the occupant of the occurrence of the abnormality by displaying the occurrence of the abnormality on the display 28.

Figure 2:
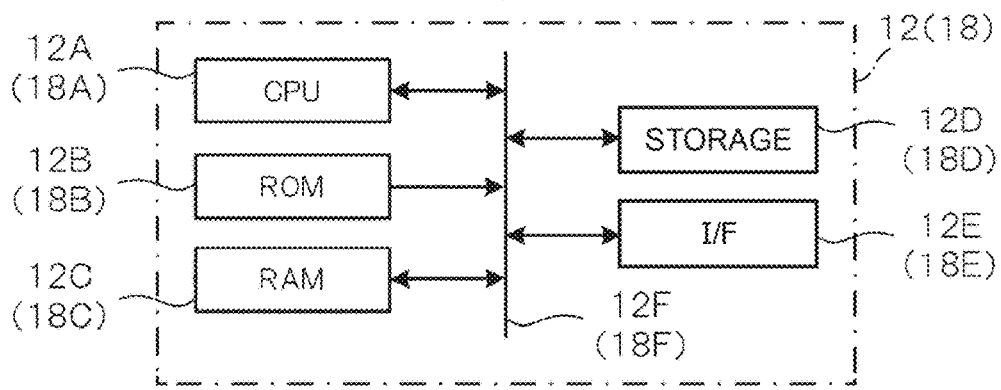
FIG. 2 is a block diagram showing the main configuration of the electrical system of the meter ECU and the fuel control ECU in the vehicle control device according to the first embodiment.

FIG. 2 is a block diagram showing the main configuration of the electrical system of the meter ECU 12 and the fuel control ECU 20 in the vehicle control device 10 according to this embodiment. Since the meter ECU 12 and the fuel control ECU 20 are basically configured as general computers, the meter ECU 12 will be described as a representative here.

The meter ECU 12 includes a central processing unit (CPU) 12A, a read only memory (ROM) 12B, a random access memory (RAM) 12C, a storage 12D, an interface (I/F) 12E, and a bus 12F. It consists of computers.

The CPU 12A is a central processing unit and controls the overall operation of the device by executing various programs. The ROM 12B stores in advance various control programs such as a refueling control program, various parameters, and the like. The RAM 12C is used as a work area or the like when various programs are executed by the CPU 12A. The storage 12D includes various storage units such as a Hard Disk Drive (HDD), Solid State Drive (SSD), flash memory, etc., and stores various data, application programs, and the like. The OF 16E can be connected to the vehicle network 22 and transmits and receives various data to and from other ECUs such as the fuel control ECU 20 connected to the vehicle network 22. Each part of the meter ECU 12 described above is electrically connected to each other by a bus 12F. In this embodiment, it is assumed that the refueling control program is stored in the ROM 12B, but it may be stored in the storage 12D.

By the way, in the control of the fuel gauge that displays the remaining amount of fuel, control is performed so that the detection result of the fuel gauge 26 is not directly reflected in the display in order to suppress the influence of vibration of the vehicle, inclination of the road surface, etc. while the vehicle is running. On the other hand, during the refueling mode, the detection result of the fuel gauge 26 is used to control the remaining amount of fuel to be detected and displayed more accurately than during running.

As in the present embodiment, when the shift position sensor 18 is provided, the method of determining whether the vehicle is stopped includes, for example, a method of determining that the vehicle is stopped when the vehicle speed is equal to or lower than a predetermined threshold, or using shift position information or parking brake information. There is a method of judging whether the vehicle is stopped by.

Figure 3:
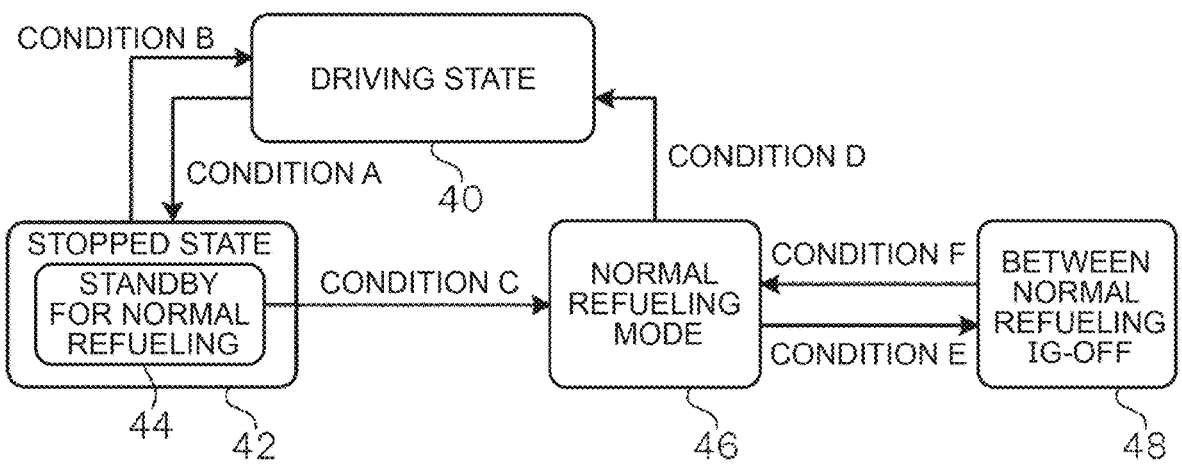
FIG. 3 is a state transition diagram showing state transitions in display control of a conventional fuel gauge.

In the display control of the conventional fuel gauge, as shown in FIG. 3, there are two states, a running state 40 and a stopped state 42, and control is performed in which the remaining amount of fuel is detected and displayed with different detection accuracy for each state. FIG. 3 is a state transition diagram showing state transitions in conventional display control of a fuel gauge.

In the running state 40, for example, the fuel injection amount is obtained from the fuel control ECU 20 without reflecting the detection result of the fuel gauge 26 as it is. A value obtained by subtracting the fuel injection amount from the remaining amount of fuel detected by the fuel gauge at the end of the previous refueling mode is displayed.

When the condition A is established from the running state 40, the state shifts to the stopped state 42. When the vehicle is stopped, the state changes to the normal refueling standby 44, and when the condition B is satisfied, the state returns to the running state 40, and when the condition C is satisfied, the state changes from the normal refueling standby 44 to the normal refueling mode 46. In the normal refueling mode 46, the detection result of the fuel remaining amount of the fuel gauge 26 is displayed.

When the condition D is satisfied in the normal refueling mode 46, the state returns to the running state 40, and when the condition E is satisfied, the state shifts to the ignition switch-off during normal refueling (IG-OFF) 48. When the condition F is established, the state returns to the normal refueling mode 46.

Here, the conditions shown below are applied to the above-described conditions A to F in the case of stopped determination using the vehicle speed.

Condition A is established when the vehicle speed is equal to or less than a predetermined vehicle speed (for example, a vehicle speed of less than 2 km/h).

Condition B is satisfied when the vehicle speed is higher than a predetermined vehicle speed (for example, a vehicle speed of less than 2 km/h).

Condition C is established when the ignition switch 14 is turned on or turned on from off and the fuel increase is equal to or greater than a predetermined normal threshold.

Condition D is satisfied when the vehicle speed is higher than a predetermined vehicle speed (for example, a vehicle speed of less than 2 km/h).

Condition E is established when the ignition switch 14 is turned off.

Condition F is established when the ignition switch 14 is turned on from off.

On the other hand, the following conditions are applied to the above-described conditions A to F in the case of stopped determination using shift position information.

Condition A is when the ignition switch 14 is continuously turned off for a predetermined time, or when the ignition switch 14 is turned on and a predetermined vehicle speed (for example, a vehicle speed of less than 2 km/h) or less is continuously set. It is established when it continues for a predetermined time and the P (parking) range or N (neutral) range continues for a predetermined time.

Condition B is established when the ignition switch 14 is on and the vehicle speed is higher than a predetermined vehicle speed (for example, a vehicle speed of less than 2 km/h) or when the range other than the P range or the N range continues for a predetermined period of time.

Condition C is established when the ignition switch 14 is on or turned on from off and the fuel increase is equal to or greater than a predetermined normal threshold.

Condition D is established when the ignition switch 14 is on and the vehicle speed is higher than a predetermined vehicle speed (for example, a vehicle speed of less than 2 km/h), or when a range other than the P range and the N range continues for a predetermined period of time.

Condition E is established when the ignition switch 14 is turned off.

Condition F is established when the ignition switch 14 is turned on from off.

Further, the following conditions are applied to the above-described conditions A to F in the case of determining whether the vehicle is stopped using the parking brake.

Condition A is when the ignition switch 14 is continuously turned off for a predetermined period of time, or when the ignition switch 14 is turned on and a predetermined vehicle speed (for example, a vehicle speed of less than 2 km/h) or less continues. This condition is satisfied when the condition continues for a predetermined period of time and the operating state of the parking brake continues for a predetermined period of time.

Condition B is established when the ignition switch 14 is on and the vehicle speed is higher than a predetermined vehicle speed (for example, a vehicle speed of less than 2 km/h).

Condition C is established when the ignition switch 14 is on or turned on from off and the fuel increase is equal to or greater than a predetermined normal threshold.

Condition D is established when the ignition switch 14 is on and the vehicle speed is higher than a predetermined vehicle speed (for example, a vehicle speed of less than 2 km/h).

Condition E is established when the ignition switch 14 is turned off.

Condition F is established when the ignition switch 14 is turned on from off.

However, when refueling determination is performed on the premise that the vehicle is stopped as in the conventional art, the accuracy of the stopped determination itself affects the reliability of the refueling determination. It should be noted that the refueling determination refers to the determination of transition from refueling standby to refueling mode.

Since 0 km/h cannot be detected strictly when the vehicle speed is used to determine whether the vehicle is stopped, there are cases where the vehicle is actually moving at extremely low speeds, and even in a state in which the vehicle is not stopped, it must be determined that the vehicle is stopped. On the other hand, when the shift position information is used, it is possible to accurately determine whether the vehicle is stopped, but in areas where refueling work is performed while the vehicle is in the driving range, the vehicle is not determined to be stopped and is treated as driving, and the system does not transition to refueling standby.

Figure 4:
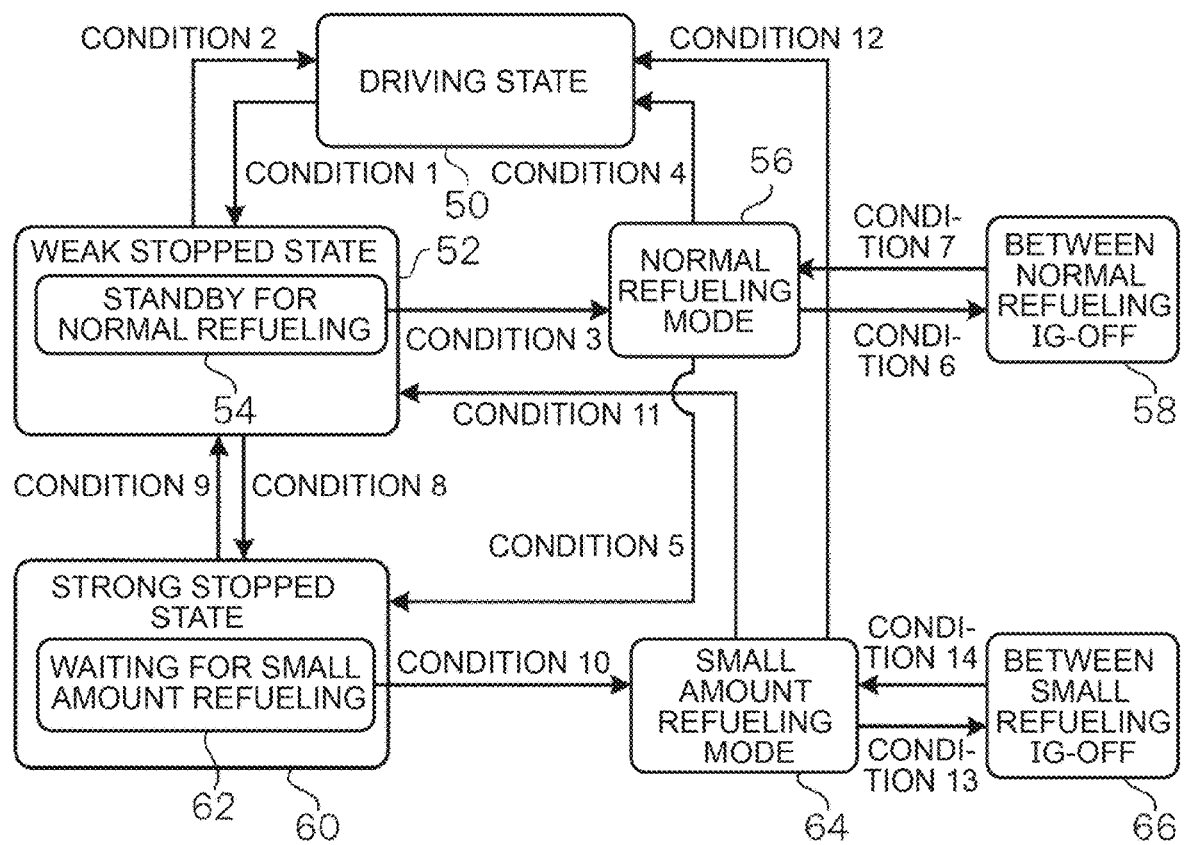
FIG. 4 is a state transition diagram showing state transitions in refueling control by the meter ECU of the vehicle control device according to the first embodiment.

Therefore, in this embodiment, as shown in FIG. 4, the conventional stopped state 42 is divided into two types: a weak stopped state 52 as a first stopped state and a strong stopped state 60 as a second stopped state. At the same time, the refueling mode is divided into a normal refueling mode 56 as a first refueling mode and a small amount refueling mode 64 as a second refueling mode, and the meter ECU 12 performs mode switching control. FIG. 4 is a state transition diagram showing state transitions in refueling control by the meter ECU 12 of the vehicle control device 10 according to the present embodiment.

This embodiment has a normal refueling mode in which refueling is detected in a weak stopped state 52 where the vehicle speed is below a predetermined speed, and a small amount refueling mode 64 in which refueling is detected in the strong stopped state where the vehicle is determined to be in a stopped state based on the detection result of the shift position sensor 18 and a vehicle speed below a predetermined speed, and the meter ECU 12 performs mode switching control. The remaining amount of fuel is detected by the fuel gauge 26 with different resolutions in the normal refueling mode 56 and the small amount refueling mode 64, and the remaining amount of fuel is displayed.

Specifically, the meter ECU 12 makes a transition to each state in FIG. 4 by determining conditions 1 to 14, which will be described later, and controls the display of the fuel gauge for each state.

That is, in the running state 50, for example, the fuel injection amount is acquired from the fuel control ECU 20 without directly reflecting the detection result of the fuel gauge 26, and is detected by the fuel gauge when the vehicle was stopped last time. A value obtained by subtracting the injection amount of fuel from the remaining amount of fuel is displayed. Alternatively, the detection result of the fuel gauge 26 is acquired for a predetermined period of time, and the detection result of the fuel gauge 26 is dulled and displayed, for example, by calculating and displaying the average value.

In the running state 50, the state shifts to the weak stopped state 52 when the condition 1 is satisfied. In the weak stopped state 52, the state is normal refueling standby 54, and when condition 2 is satisfied, the state returns to running state 50, and when condition 3 is satisfied, the state shifts from normal refueling standby 54 to normal refueling mode 56. In the normal refueling mode 56, the meter ECU 12 displays the detection result of the fuel remaining amount of the fuel gauge 26. At this time, in the normal refueling mode 56, for example, a fuel increase of about 15 L is detected and displayed as the resolution for detecting the fuel increase.

In the normal refueling mode 56, when condition 4 is satisfied, the state returns to the running state 50, when condition 6 is satisfied, the state shifts to normal refueling IG-OFF 58, and when condition 7 is satisfied, the state goes back to the normal refueling mode 56. Further, when the condition 5 is established in the normal refueling mode 56, the state shifts to the strong stopped state 60, which will be described later.

In the weak stopped state 52, the state shifts to the strong stopped state 60 when the condition 8 is satisfied. In the strong stopped state 60, the state becomes a small amount of refueling standby 62, and when the condition 10 is satisfied, the state shifts from the small amount of refueling standby 62 to a small amount refueling mode 64. In the small amount refueling mode 64, the meter ECU 12 displays the detection result of the remaining amount of fuel in the fuel gauge. Here, in the small amount refueling mode 64, a smaller amount of fuel increase is detected than in the normal refueling mode 56, and the result of detecting the remaining amount of fuel more accurately than in the normal refueling mode is displayed. In the small amount refueling mode 64, as the resolution for detecting the fuel increase, for example, compared to the normal refueling mode 56, a small fuel increase of about 2 L is detected and displayed.

In the small amount refueling mode 64, when the condition 12 is established, the state returns to the running state 50, and when the condition 13 is established, the state becomes IG-OFF during the small amount of refueling 66, and when the condition 14 is established, the state changes. It returns to the small amount refueling mode 64.

The following conditions are applied as an example of the above conditions 1 to 14 in this embodiment.

Condition 1 is satisfied when the ignition switch 14 is on, the vehicle speed is equal to or lower than a predetermined vehicle speed, and the P range or N range continues for a predetermined time.

Condition 2 is met when the ignition switch 14 is on and the vehicle speed is higher than a predetermined vehicle speed (for example, a vehicle speed of less than 2 km/h).

Condition 3 is met when the ignition switch 14 is turned on or turned on from off and the remaining amount increases by a predetermined normal threshold or more.

Condition 4 is established when the ignition switch 14 is on and the vehicle speed is higher than a predetermined vehicle speed (for example, a vehicle speed of less than 2 km/h).

Condition 5 is satisfied when the P range or the N range continues for a predetermined period of time.

Condition 6 is met when the ignition switch 14 is turned off.

Condition 7 is satisfied when the ignition switch 14 is turned on from off.

Condition 8 is satisfied when the ignition switch 14 is on, the vehicle speed is higher than a predetermined vehicle speed (for example, a vehicle speed of less than 2 km/h), and the P range or N range continues for a predetermined time.

Condition 9 is satisfied when the ignition switch 14 is ON, the vehicle speed is equal to or lower than a predetermined vehicle speed (for example, a vehicle speed of less than 2 km/h), and the range other than the P range or the N range continues for a predetermined period of time.

Condition 10 is satisfied when the ignition switch 14 is turned on or turned on from off and the remaining amount increases by a predetermined small amount threshold or more.

Condition 11 is satisfied when ranges other than the P range and the N range continue for a predetermined period of time.

Condition 12 is met when the ignition switch 14 is on and the vehicle speed is higher than a predetermined vehicle speed (for example, a vehicle speed of less than 2 km/h).

Condition 13 is satisfied when the ignition switch 14 is changed from ON to OFF.

Condition 14 is met when the ignition switch 14 is turned on from off. Thus, in this embodiment, by providing the normal refueling mode 56 in the weak stopped state 52 in which the stop is determined only by the vehicle speed, refueling can be determined even if the shift position is not in the P range or N range.

In addition, by providing a small amount refueling mode 64 in the strong stopped state 60 in which the vehicle stop is determined based on the shift position information in addition to the vehicle speed and the refueling determination is performed, it is possible to reliably determine the vehicle stop before determining the refueling. Refueling can be determined with detection accuracy higher than that in normal refueling mode 56.

Therefore, compared with the case where only the conventional normal refueling mode 46 is provided, the reliability of refueling determination can be improved.

Second Embodiment

Figure 5:
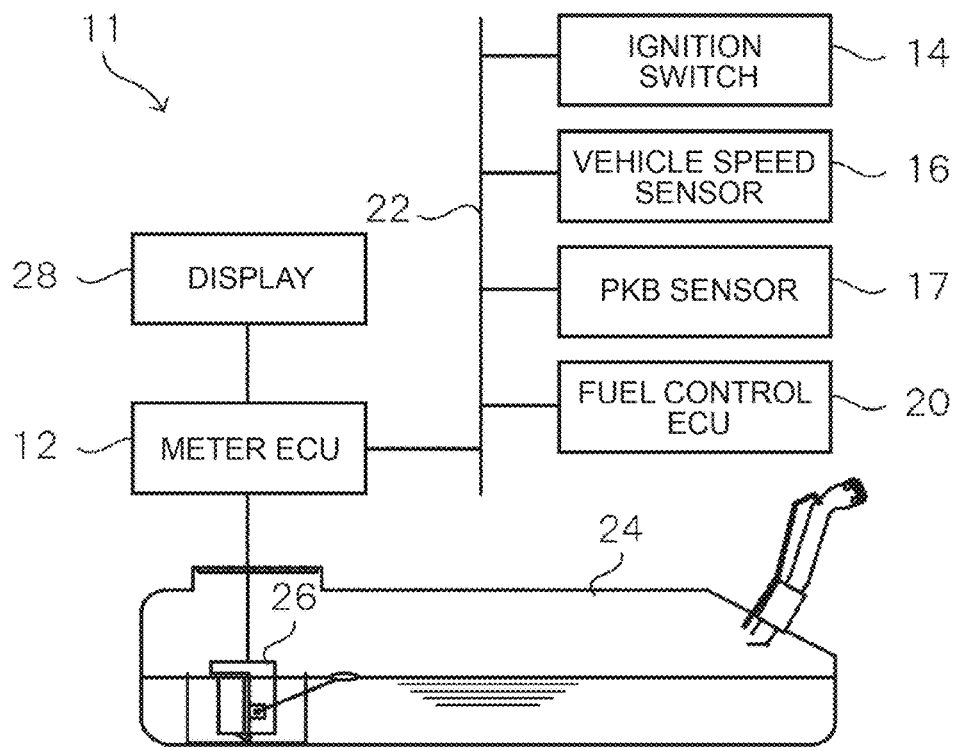
FIG. 5 is a block diagram showing a schematic configuration of a vehicle control device according to a second embodiment.

Next, a vehicle control device according to a second embodiment will be described. FIG. 5 is a block diagram showing a schematic configuration of the vehicle control device according to this embodiment.

In the above embodiment, an example was described in which the detection result of the shift position sensor 18 was used to determine the state transition. A manual transmission vehicle may not be provided with the shift position sensor 18. Therefore, the present embodiment differs from the above embodiment in that the detection result of the parking brake (PKB) sensor 17 is used instead of the detection result of the shift position sensor 18. Only differences from the above embodiments are described.

That is, as shown in FIG. 5, in the vehicle control device 11, instead of the shift position sensor 18, the PKB sensor 17 for detecting the operating state of the parking brake is connected to the vehicle network 22.

The state transition is the same as in the above embodiment, but since the detection result of the PKB sensor 17 is used instead of the shift position sensor 18, one example of conditions 1, 5, 8, and 9 out of the conditions 1 to 14 described above The following conditions apply as follows:

Condition 1 is satisfied when the ignition switch 14 is on, the vehicle speed is equal to or lower than a predetermined vehicle speed, and the parking brake is continuously operated for a predetermined time.

Condition 5 is satisfied when the parking brake continuously operates for a predetermined period of time.

Condition 8 is satisfied when the ignition switch 14 is on, the vehicle speed is higher than a predetermined vehicle speed (for example, a vehicle speed of less than 2 km/h), and the parking brake is continuously operated for a predetermined time.

Condition 9 is satisfied when the ignition switch 14 is on, the vehicle speed is equal to or lower than a predetermined vehicle speed, and the parking brake is continuously inoperative for a predetermined time period.

Condition 11 is satisfied when the parking brake is continuously inoperative for a predetermined period of time.

Even in this way, similar to the above-described embodiment, the reliability of refueling determination can be improved compared to the case where the refueling mode is only the normal refueling mode 46 as in the conventional art.

Third Embodiment

Figure 6:
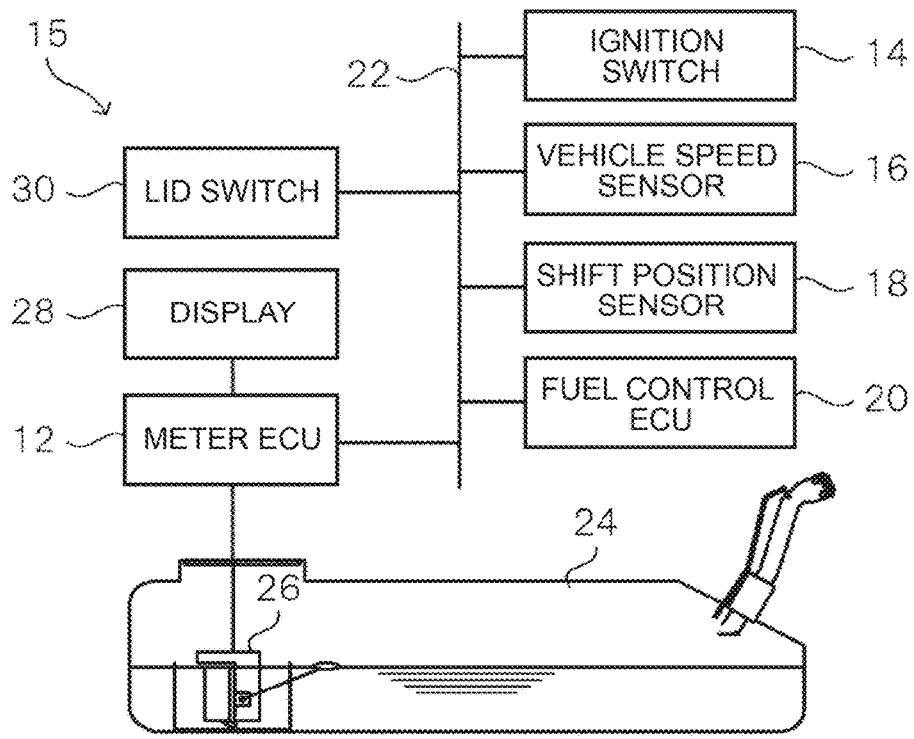
FIG. 6 is a block diagram showing a schematic configuration of a vehicle control device according to the third embodiment.

Next, a vehicle control device according to a third embodiment will be described. FIG. 6 is a block diagram showing a schematic configuration of the vehicle control device according to this embodiment.

A vehicle control device 15 according to the present embodiment differs from the first embodiment only in that a lid switch 30 is further provided as shown in FIG. 6.

The lid switch 30 detects an open/closed state of a filler lid provided at a refueling port. In this embodiment, the opening of the filler lid can be detected by the lid switch 30.

Figure 7:
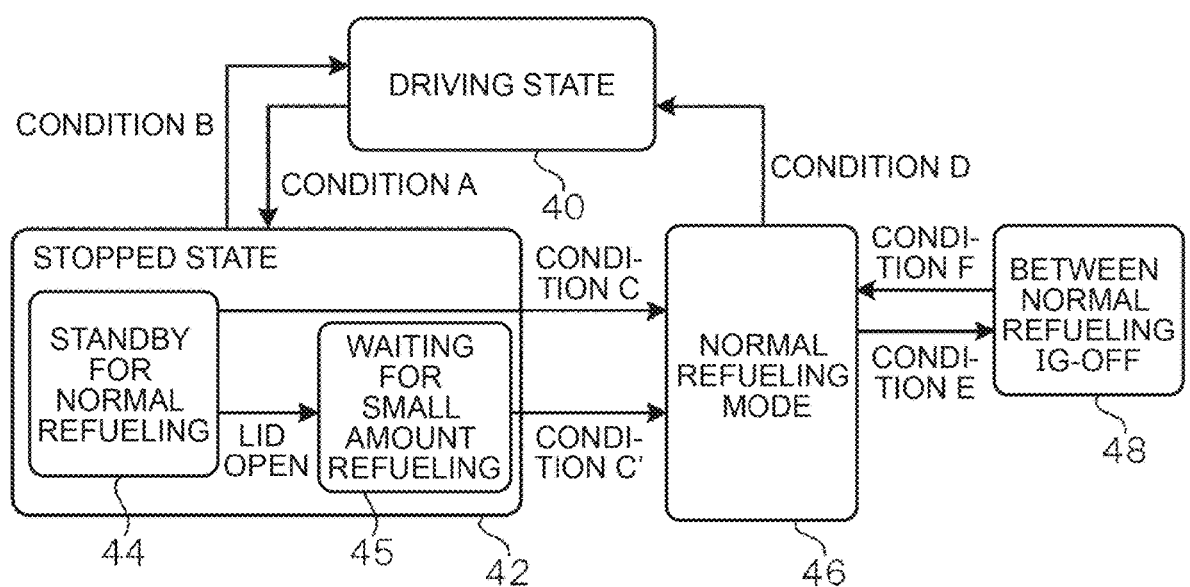
FIG. 7 is a state transition diagram showing state transitions in display control of a conventional fuel gauge with a lid switch.
Figure 8:
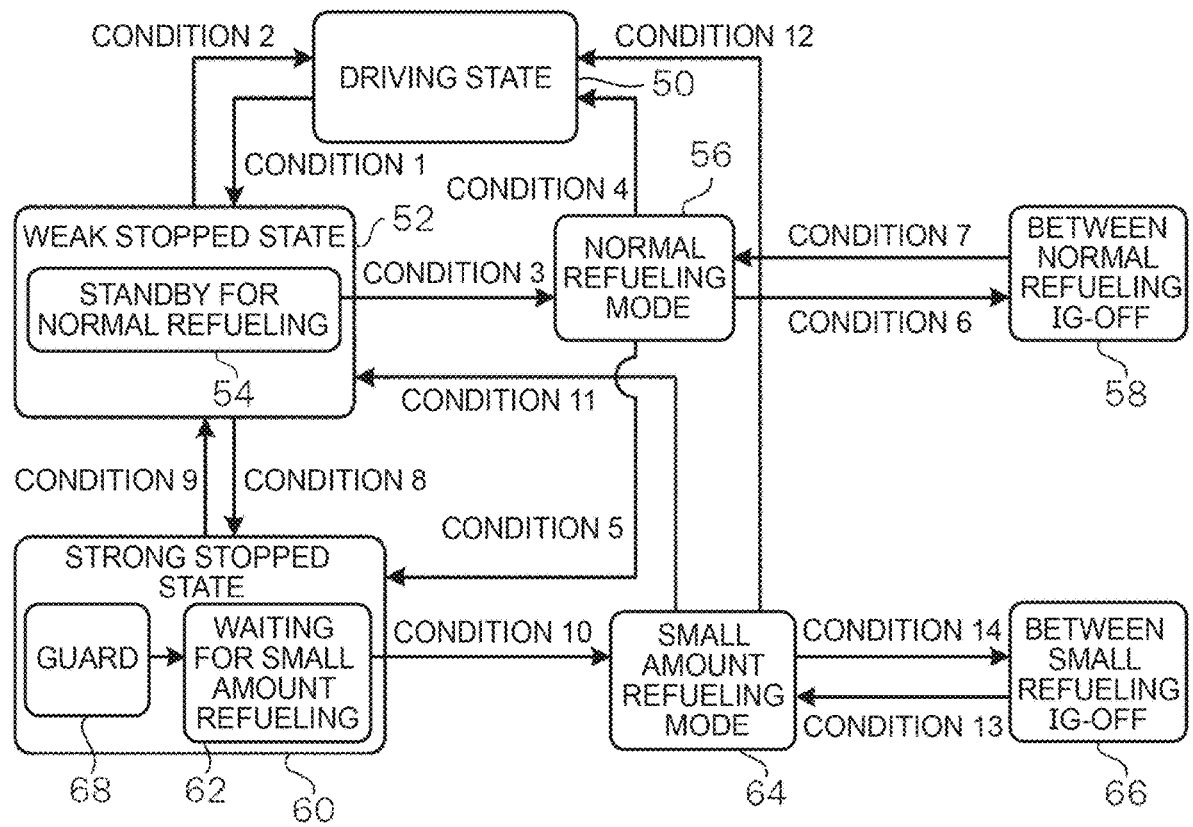
FIG. 8 is a state transition diagram showing state transitions in refueling control by the meter ECU of the vehicle control device according to the third embodiment.

FIG. 7 is a state transition diagram showing state transitions in display control of a conventional fuel gauge when the lid switch 30 is provided. FIG. 8 is a state transition diagram showing state transitions in refueling control by the meter ECU 12 of the vehicle control device 15 according to this embodiment.

As shown in FIG. 7, in the conventional state transition when the lid switch 30 is provided, a small amount of refueling standby 45 is further provided in the stopped state 42 in contrast to FIG. 3. The state shifts from normal refueling standby 44 to small amount of refueling standby 45. Then, when the condition C' is satisfied, the normal refueling mode 46 is entered. Condition C' is established when the ignition switch 14 is on or turned on from off and the fuel increase is equal to or greater than a predetermined normal threshold.

On the other hand, the state transition of the present embodiment differs from that of the first embodiment only in that the guard 68 is provided in the strong stopped state 60 as shown in FIG. 8. That is, in this embodiment, when the vehicle shifts to the strong stopped state 60, the state is the guard 68 state, and when the lid switch 30 detects that the filler lid is open, the state is the small amount of refueling standby 62. Then, when the condition 10 is established in the small amount of refueling standby 62, the state shifts to the small amount refueling mode 64. By using the detection result of the lid switch 30 in this manner, the accuracy of refueling determination can be further improved.

Figure 9:
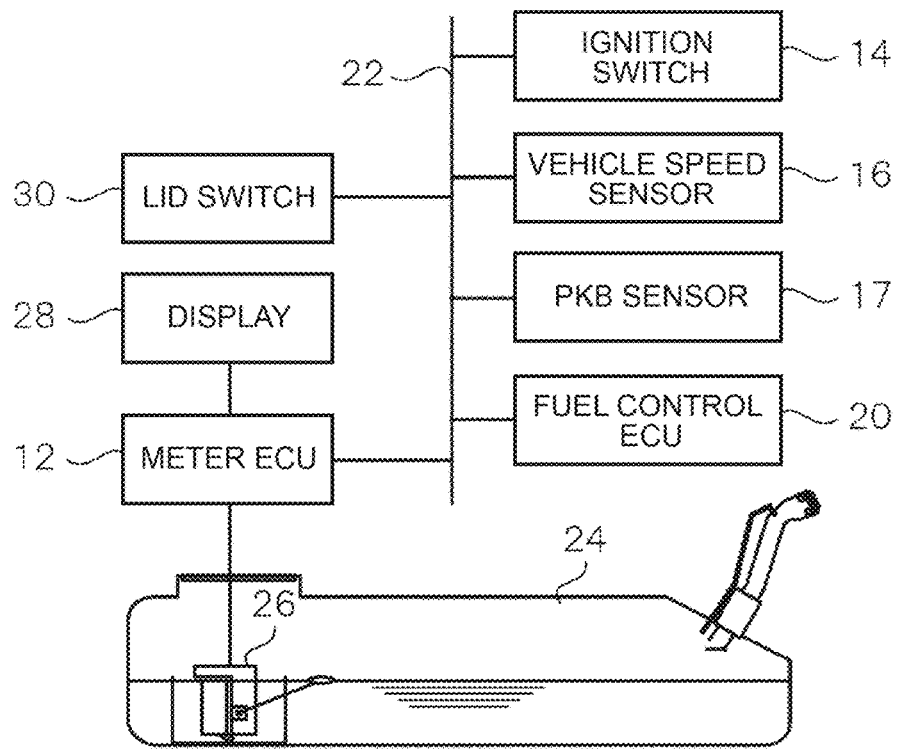
FIG. 9 is a diagram showing an example in which a lid switch is provided for the second embodiment.

In the third embodiment, the lid switch 30 is provided for the first embodiment, but the present disclosure is not limited to this. As shown in FIG. 9, the lid switch 30 may be provided in the second embodiment.

Further, in the first and third embodiments, the detection result of the shift position sensor 18 is used, and in the second embodiment, the detection result of the PKB sensor 17 is used. However, the present disclosure is not limited to this. For example, both the detection result of the shift position sensor 18 and the detection result of the PKB sensor 17 may be used.

Further, the processing performed by the meter ECU 12 in each of the above embodiments may be software processing performed by executing a program. Alternatively, the processing may be performed by hardware such as a Graphics Processing Unit (GPU), Application Specific Integrated Circuit (ASIC), Field-Programmable Gate Array (FPGA), or the like. Alternatively, the process may be performed by a combination of both software and hardware. Further, in the case of software processing, the program may be stored in various storage media and distributed.

Furthermore, the present disclosure is not limited to the above, and it goes without saying that the present disclosure can be variously modified and implemented within the scope thereof.

What is claimed is:

1. A fuel gauge control device comprising a control unit that includes
    a first refueling mode in which refueling is detected in a first stopped state in which a vehicle speed is no greater than a vehicle speed set in advance, and
    a second refueling mode in which refueling is detected in a second stopped state in which a vehicle is determined to be in a stopped state in which the vehicle speed is no greater than the vehicle speed set in advance, and based on shift position information or parking brake information, wherein switching control of modes is performed based on a state of the vehicle.

2. The fuel gauge control device according to claim 1, wherein, in the second refueling mode, a small fuel increase is detected as compared to the first refueling mode.

3. The fuel gauge control device according to claim 1, wherein the second stopped state is a state in which the vehicle speed is no greater than the vehicle speed set in advance, and a shift position continues to be a parking range or a neutral range for a duration of time set in advance.

4. The fuel gauge control device according to claim 1, wherein the second stopped state is a state in which the vehicle speed is no greater than the vehicle speed set in advance, and a parking brake continues to be in operation for a duration of time set in advance.

\* \* \* \* \*